United States Patent [19]
Sosa et al.

[11] Patent Number: 5,540,813
[45] Date of Patent: Jul. 30, 1996

[54] METHOD FOR REDUCING VOLATILES IN POLYMERIZED STYRENE

[75] Inventors: Jose M. Sosa, Deer Park; Robert M. Scates, Spring, both of Tex.; James N. Weguespack, Baton Rouge, La.; Bruce P. Blackmar; Scott W. Davis, both of Houston, Tex.

[73] Assignee: Fina Technology, Inc., Dallas, Tex.

[21] Appl. No.: 184,085

[22] Filed: Jan. 19, 1994

[51] Int. Cl.⁶ .................................................. B01D 1/00
[52] U.S. Cl. ........................... 159/47.1; 159/2.3; 159/2.1
[58] Field of Search ..................... 159/2.3, 2.1, 2.2, 159/47.1; 528/501

[56] References Cited

U.S. PATENT DOCUMENTS

| | | | |
|---|---|---|---|
| 3,311,676 | 3/1967 | Toekes . | |
| 3,668,161 | 6/1972 | Nauman et al. . | |
| 3,683,511 | 8/1972 | Johnson et al. | 528/501 |
| 3,865,672 | 2/1975 | Metzinger et al. | 159/47.1 |
| 3,884,766 | 5/1975 | Bir et al. | 159/2.3 |
| 3,928,300 | 12/1975 | Hagberg . | |
| 3,966,538 | 6/1976 | Hagberg | 159/2.1 |
| 4,178,435 | 12/1979 | Tee et al. | 528/501 |
| 4,198,265 | 4/1980 | Johnson | 528/501 |
| 4,294,652 | 10/1981 | Newman . | |
| 4,439,601 | 3/1984 | McCurdy . | |
| 4,537,954 | 8/1985 | Ando | 528/501 |
| 4,777,210 | 10/1988 | Sosa | 525/53 |
| 4,857,587 | 8/1989 | Sosa . | |
| 5,200,476 | 4/1993 | Sosa . | |

*Primary Examiner*—Robert J. Warden
*Assistant Examiner*—Theresa T. Snider
*Attorney, Agent, or Firm*—Michael J. Caddell; M. Norwood Cheairs

[57] ABSTRACT

Methods and apparatus are disclosed for purifying polymerized monovinyl aromatic compounds such as polystyrene by reducing the residual monomer content of the finished polymer, said methods and apparatus including a combination of heat exchangers and devolatilizers used in conjunction with a monovinyl aromatic polymerization reactor system.

17 Claims, 1 Drawing Sheet

U.S. Patent
Jul. 30, 1996
5,540,813
Figure
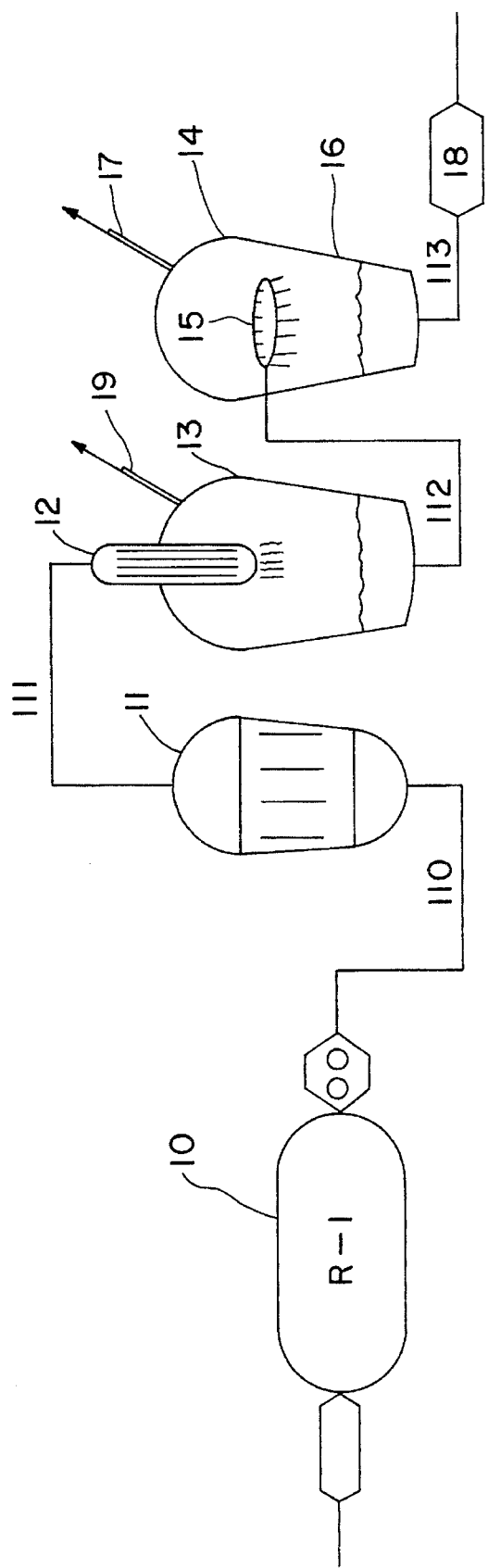

METHOD FOR REDUCING VOLATILES IN POLYMERIZED STYRENE

BACKGROUND OF THE INVENTION

The present invention is generally related to the removal of undesirable components from polymerized monovinyl aromatic compounds and more particularly is directed to the removal of volatile materials at the end of the polymerization process for monovinyl aromatic compounds such as polystyrene, while incorporating options to improve and optimize critical polymer properties.

It is well known in the polymer industry that volatiles such as unreacted monomer, dimers, and trimers may be removed from newly polymerized monovinyl aromatic compounds by means such as vacuum distillation and flash devolatilization. The vacuum process subjects the polymer to sub-atmospheric conditions to draw out the volatile components and the flash process may involve vacuum as well as heat to further drive out the volatiles. In addition to vacuum and heat devolatilization techniques, another method known in the art is that of "stripping" of volatiles by the use of stripping agents such as steam.

Toekes U.S. Pat. No. 3,311,676 teaches the devolatilization of a rubber modified polystyrene by the use of a preheater, a heat exchanger, and a vacuum vessel which Toekes classifies as a phase separator. The preheater heats the volatile-containing polystyrene material into the range of 200° to 240° C. and the heat exchanger maintains the temperature of the material while subjecting it to a reduced pressure in the range of 15 to 50 mm Hg. The vacuum on the heat exchanger is a result of its connection to the phase separator which operates at a pressure of 5 to 100 mm Hg. Toekes describes the process wherein a foam is generated in the heat exchanger and flows into the phase separator thereby accelerating the removal of volatiles by a many-fold increase in surface area of the material. The Toekes apparatus and procedure claims a reduction in volatiles to approximately 0.5 to 1.5 percent by weight which corresponds to a volatile level of 5000 to 15,000 PPM. According to Toekes, the monomer and EB (ethylbenzene) level was reduced to "below 0.1%" which corresponds to 1000 PPM.

Newman U.S. Pat. No. 3,668,161 et al. discloses a method for separating volatiles from a polymer by passing the polymer through a first flash devolatilization zone maintained at a vacuum and heating the partially devolatilized composition, adding a foaming agent and then passing through a second devolatilization zone at reduced pressure to vaporize and remove remaining volatile constituents. Polystyrene materials devolatilized by this process according to examples contained in the patent ended up with residual styrene in the amount of 2000 PPM.

Mertzinger U.S. Pat. No. 3,865,672 dated Feb. 11, 1975 discloses a process to remove volatiles from a polymer solution by using a single stage vacuum evaporation system in which the temperature of the polymer solution increases in the direction of the flow. Metzinger is concerned primarily with polymers containing acrylonitrile or methacrylonitrile. The process is achieved in Metzinger by the use of a counter-flow heat exchanger combined with a vacuum devolatilization zone. The counter-flow heat exchanger thus allows the heat to increase in the polymer as it proceeds through the devolatilization zone. More particularly, Metzinger discloses a vertical tube bundle heat exchanger operating in a downflow configuration wherein the polymer solution is fed at the top, devolatilized during the downflow, and then removed at the bottom. Likewise, the temperature gradient maintained in the heat exchanger increases from top to bottom such that the devolatilized polymer is subjected to increasing temperatures as it flows through the devolatilizing system. According to Metzinger, the volatile content was reduced to 3000 PPM.

Hagberg U.S. Pat. No. 3,928,300 dated Dec. 23, 1975 discloses a process for devolatilizing polystyrene by subjecting it to a downflow "falling strand" devolatilizer. A falling strand devolatilizer consists of a shell-and-tube heat exchanger in a vertical configuration stationed in the upper portion of a "flash tank". The flash tank has a vapor pump communicating therewith to remove volatiles which are flashed out of the polymer. The vertical shell-and-tube heat exchanger comprises a series of parallel tubes held rigidly within the heat exchanger shell in a vertical orientation. Heated polymer flows through the tubes in response to gravity and the pressure differential established by the vapor pump which creates a vacuum in the flash tank. The heated polymer exits the tubes of the heat exchanger in strands or strings which then release the volatiles due to the combination of heat from the heat exchanger and the low pressure in the flash tank. The strands drop to the lower end of the conical flash tank and then are regulated by a plug valve and flowed downward into a hold tank which may also be used as a second flash tank. The Hagberg patent claims a method of controlling the volatiles in the polymer by varying both the length and the diameter of the tubes in the shell-and-tube heat exchanger. The residual monomer and oligomer remaining in the polymer after the Hagberg process is shown as ranging from 1000 to 110,000 PPM.

Hagberg U.S. Pat. No. 3,966,538 also issued Jun. 29, 1976 is a divisional case of the Hagberg patent above with claims directed to the apparatus rather than the process.

Newman U.S. Pat. No. 4,294,652 issued Oct. 13, 1981 discloses apparatus and process almost identical to the aforedescribed Hagberg devices. The only difference between the Newman device and the Hagberg devices is that the lower holding tank of Hagberg has been modified slightly by adding a pump-around pump and two baffles plus a vapor line out of the hold tank to achieve some slight additional devolatilizing in the lower holding tank. Although the Newman disclosure contains no specific examples of actual trial runs, Newman claims devolatilization of monomer content to less than about 100 to 500 PPM. No figures are stated for other volatiles contained in the finished polymer.

McCurdy et al U.S. Pat. No. 4,439,601 issued Mar. 27, 1984 discloses a process for devolatilization of mass processible polymers through the use of two or more flash devolatilizers in series and by utilizing a nonrefrigerated cooling process to condense the volatiles which are separated from the flash zones. The nonrefrigerated cooling process described uses a coolant such as water circulated through a heat exchanger to condense the volatiles in the multi-stage flash devolatilization. Each flash devolatilizer is operated at a lower pressure than the preceding one. No figures are given in the McCurdy disclosure for the levels of volatiles remaining in the finished polymer product.

Sosa et al U.S. Pat. No. 4,777,210 issued Oct. 11, 1988, discloses methods and apparatus for producing high-impact polystyrene having discrete particles of rubber in a styrene matrix. The process utilizes a preinversion reactor to closely control viscosity of the solutions and to produce desirable high-impact polystyrene products.

Sosa et al U.S. Pat. No. 4,857,587 issued Aug. 15, 1989, discloses methods and apparatus for producing high-impact polystyrene by removing inhibiting impurities from the recycle stream of the styrene polymerization zone.

Sosa et al U.S. Pat. No. 5,200,476 issued Apr. 6, 1993, discloses a system for reducing volatiles in a polymerization line, said system utilizing partial condensers, total condensers, devolatilizers, and filter beds arranged in series. The disclosures and specifications of the three aforementioned Sosa et al patents are herein incorporated by reference in their entirety into the present application.

SUMMARY OF THE INVENTION

The present invention discloses a process for devolatilizing monovinyl aromatic compounds after polymerization which process utilizes a combination of sequentially ordered multiple heat exchangers and multiple devolatilizers to not only remove substantial portions of volatiles from the polymer but also to allow strict control of other parameters such as melt flow index and molecular weight distribution.

BRIEF DESCRIPTION OF THE DRAWINGS

FIG. 1 is a schematic diagram of the heat exchanger/devolatilizer system of the present invention.

BRIEF DESCRIPTION OF THE PREFERRED EMBODIMENTS

In the present invention, devolatilization processes and apparatus are disclosed for use with polymerization systems such as those disclosed in the aforementioned Sosa et al patents incorporated by reference. The present invention as disclosed in FIG. 1 is particularly suitable for use with the HIPS manufacturing process of Sosa '210.

In FIG. 1 of the present application, the reactor R-1 is identified at 10 in the present system. Normally, reactor R-1 would comprise the last reactor in the series of reactors for manufacturing high-impact polystyrene. With the present invention, however, R-1 can be utilized as the penultimate reactor by adjusting the heat input of heat exchanger 11 high enough to serve as an additional polymer reactor. Heat exchanger 11 is connected to reactor R-1 by flowline 110. It should be noted that preferably heat exchanger 11 is of the "upflow" type where heated polymer enters at the bottom end of the vessel and flows upward through a shell-and-tube heat exchanger to exit through the top of the vessel via exit line 111. Polymer flows from heat exchanger 11 into a downflow heat exchanger 12 at the opposite end of flowline 111. Downflow exchanger 12 is situated in a flash devolatilization tank 13 (DV-1) maintained at a vacuum of from about 20 Torr up to about 200 Torr.

In one preferred embodiment, the heat exchanger 12, also known as a devolatilizer preheater, was maintained at an operating temperature of about 550° F. and consisted of a shell-and-tube heat exchanger having tubes about one inch in diameter and 5 feet long. In this embodiment, heat exchanger 11 was maintained at around 300° F. The polymer exiting the devolatilizer preheater 12 accumulated in the lower section of devolatilizer vessel 13 at a temperature of about 440° F.

A polymer flowline 112 connected to the lower end of devolatilizer tank 13 communicates partially devolatilized polymer to the second devolatilizer 14 (DV-2) having a "hoop" falling strand devolatilizer nozzle system 15 located concentrically therein. Devolatilized vapors are removed from devolatilizers 13 and 14 through vapor removal lines 19 and 17 respectively. These lines are maintained at a vacuum by connection to a vacuum source such as a vacuum pump (not shown). The volatiles removed through vapor lines 19 and 17 are then passed to a normal condenser and reduced to their liquid stage whereupon they may be recycled back into the polystyrene polymerization process at any desirable point.

The structure of the second devolatilizer 14 comprises an outer vessel 16 containing the hoop nozzle manifold 15 located in the upper portion thereof. Hoop nozzle manifold 15 comprises a circular flow tube having a plurality of small orifice nozzles directed downwardly in vessel 16 to allow molten polymer entering from line 112 to fall downward in relatively small diameter continuous vertical strands, thereby exposing a large surface area of the polymer to the vacuum level contained in devolatilizer 14. The vacuum level in devolatilizer 14 is maintained at a level of from less than 1 up to about 20 Torr. The diameter of the nozzles located in manifold 15 is less than about 5/32 inch, preferably less than about 5/64 inch, and most preferably in the range of about 3/64 inches or smaller in flow diameter. The diameter of the flow tubes in the devolatilizer preheater 12 is about 0.9 to 1.0 inches. A flowline 113 exits the lower end of the second devolatilizer 14 and transmits the completely devolatilized polymer material to a finishing operation such as a pelletizer 18.

Thus, in typical operation, polymer from a polystyrene manufacturing process, such as that disclosed in the incorporated Sosa '210 patent, enters the devolatilization system from the final reactor R-1, indicated at 10, through flowline 110 into the first heat exchanger 11. From there the polymer flows upward through the shell-and-tube heat exchanger and out through flowline 111 into a second heat exchanger denoted as the devolatilizer preheater and indicated at 12, which is also a shell-and-tube heat exchanger arranged in a downflow configuration. Heated polymer then passes through the downflow heat exchanger into a vacuum flash tank 13 allowing volatiles to flash off as they exit the heat exchanger 12. The vaporized volatiles are removed through vapor line 19 from devolatilizer 13. Partially devolatilized polymer is then drawn off through flowline 112 and injected through a circular manifold nozzle system 15 in a second devolatilizer 16 also maintained at a vacuum. This allows additional devolatilization of the polymer as the volatiles are removed from vapor line 17 by vacuum means known to those skilled in the art.

Volatiles removed by means of lines 17 and 19 are recycled back into the polymer reaction system as indicated in the aforementioned incorporated Sosa patent '587. The heated polymer exiting the nozzles of manifold 15 into the second devolatilizer chamber 16 maintained at a vacuum then flows down and is collected at the bottom end of chamber 16 and removed by flowline 113. The completely devolatilized polymer is then cooled, pelletized at pelletizer 18 and readied for shipment to the consumer.

Table I below indicates the parameters of operating the system of FIG. I such that different characteristics of the polymer may be adjusted or manipulated to obtain different properties of crystal polystyrene, high-impact polystyrene, general purpose polystyrene or of other polymerized monovinyl aromatic compounds. The parameters in Table 1 indicate the widest desirable ranges of parameters.

TABLE I

| Parameter | Heat Exchanger | Preheater | DV-1 | DV-2 |
|---|---|---|---|---|
| Temperature | 300–550° F. | 440–550° F. | 440° F. | — |
| Pressure (PSI) | 10–20 PSI | 5–10 PSI | | |
| Vacuum (Torr) | | | 10–200 Torr | 0–20 Torr |
| Nozzle Diameter | | | | <3/64"–1/2" |

TABLE II

| | A | B | C | D | E |
| Polymer Property | Heat Exchanger | Preheater | DV-1 | DV-2 | Nozzle Diam. |
|---|---|---|---|---|---|
| 1. Melt Flow Index | T = 400–500° F. | T = 500–550° F. | | | |
| 2. Mol. Wt. Dist. | T = 300–400° F. | T = 440–550° F. | | | |
| 3. Volatiles Level | T = 300–400° F. | T = 440–550° F. | | | 5/32" to <3/64" |
| 4. Swell Index | T = 300–400° F. | T - 440–550° F. | P - 200 Torr | P<20 Torr | |
| 5. High Production Rates | T = 400–500° F. | T = 500–550° F. | P = 100 Torr | P>20 Torr | |

Table II indicates preferred ranges of parameters for obtaining the desired polymer properties as indicated in column 1 of Table II. In Table I the temperature ranges for the heat exchanger and the preheater are shown as 320° to 550° F. and 440° to 550° F. respectively. The pressure/vacuum of the vessels is indicated in the second line of Table I as being 10 to 20 psi for the heat exchanger, 5 to 10 psi for the preheater, 10 to 200 Torr for the first devolatilizer and 1 to 20 Torr for the second devolatilizer. Line 3 of Table I indicates a preferred nozzle diameter in the second devolatilizer of from 5/32 inch down to as small as 3/64 inch and less.

Table II indicates desirable ranges to obtain certain particular product properties in a monovinyl aromatic polymer containing rubber. For example, in line 1, to manipulate the final product and obtain the most desirable melt flow index, the system would be operated in such a manner that the first heat exchanger 11 is operated at a relatively high temperature, i.e., 400° to 500° F., in order to act as an additional reactor. The preheater would then be operated at an elevated temperature of 500° to 550° F. This would result in an additional 10 to 15 percent conversion occurring in the heat exchanger and a very low molecular weight product, thereby achieving a desirable melt flow index. Line 2 of Table II indicates a method of obtaining a high molecular weight product and a low molecular weight distribution. This prevents the formation of short polymer chains by operating the heat exchanger at a relatively low 300° to 400° F. thereby preventing rapid polymerization of any unreacted monomer into short polymer chains in the heat exchanger. The preheater then is operated at temperatures in the range of 440° to 550° F. Reduced volatiles levels in the finished polymer can be achieved by manipulating the temperature, pressure and mass flow rate in vessels 11, 12, 13, and 14; or alternatively, by changing the nozzle diameter in the second devolatilizer to sizes as low as 3/64" or less. Optimization of these three parameters is critical to yield materials with good properties and low levels of volatile materials.

In the fourth line of Table II is a parameter indicated as "swell index" which relates to the amount of cross-linking of the rubber particles in the finished product. The swell index is manipulated by adjusting the vacuum levels in the two devolatilizers. The percent solids leaving the reactor R-1 in the polymer/monomer flow is approximately 70%. The final solids level at the exit line of devolatilizer 13 (DV-1) would normally be in the range of 99.5% when the vacuum in DV-1 is maintained at around 20 Torr. This results in a reduction in volatiles, but on the other hand, results in an undesirable swell index. The 99.5% solids level exiting DV-1 is a result of cross-linking of rubber particles in the high-impact polystyrene matrix which makes the rubber particles less flexible and therefore less desirable. By maintaining a solids content of 98.5% exiting the first devolatilizer, a greater flexibility in the rubber particles is achieved. By utilizing either an optimum nozzle diameter or the correct pressure and temperature through the second devolatilizer, one is able to manipulate the swell index by leaving some volatiles in DV-1, thus having a percent solids of only 98.5% rather than 99.5%. These remaining volatiles can then be removed in devolatilizer 14 as a result of a proper balance of strand diameter and pressure drop in the devolatilizer.

If the operator of the present system wishes to maintain high production rates rather than concentrating on the aforementioned parameters, the manipulation involved would be to raise the temperature of the heat exchanger and utilize it as an additional reactor. This is indicated in line 5 of Table II wherein the temperature in the heat exchanger is maintained at a level of 400° to 500° F. and the temperature in the preheater at a level of 500° to 550° F. The vacuum level in DV-1 is maintained at around 100 Torr and in DV-2 at around 20 Torr. This results in high production rates but with a sacrifice in molecular weight distribution characteristics.

Thus, the present invention discloses methods and apparatus for devolatilizing polymer from systems such as high-impact polystyrene manufacturing processes, which devolatilizing processes and apparatus allow the manufacturer to control several different parameters of the finished product, including melt flow index, molecular weight distribution, volatile levels, swell index and production rates. These are achieved by the use of a combination upflow heat exchanger, downflow heat exchanger and dual devolatilization tanks as well as temperature control, vacuum level control and nozzle diameter control to manipulate the various parameters and property characteristics of the finished product.

During actual manufacturing runs of general purpose polystyrene and high-impact polystyrene using conventional processes, applicants were obtaining finished polymers with volatile contents no lower than 700 PPM. In order to reduce the volatile contents below this level it was necessary using conventional technology to utilize stripping agents such as steam stripping to further remove volatiles from the polymer without degrading the quality of the polymer. By utilizing the present invention however, it was found that by manipulating the operating conditions as described hereinabove, it was possible to obtain finished polymers with volatile contents of 200 PPM and less, without the need for extensive additional stripping methods such as steam stripping.

TABLE III

| | | | Conditions | | | | | Polymer Properties | | | |
|---|---|---|---|---|---|---|---|---|---|---|---|
| | | | DV-1 | | DV-2 | | | | | | |
| Exp. # | Heat Exchanger (°F.) | Preheat T(°F.) | T(°F.) P(Torr) | | T(°F.) P(Torr) | | $MFI_c$ | $MWD_d$ | $Residual_e$ SM(ppm) | $S.I._f$ | Rate lbs/hr |
| $1_a$ | 500 | — | 500 | 23 | 500 | 4.0 | 5.1 | 2.5 | 390 | 11.7 | 120 |
| 2 | 320 | 470 | 470 | 20 | 470 | 7.0 | 3.3 | 2.5 | 300 | 9.9 | 81 |
| 3 | 375 | 460 | 490 | 20 | 475 | 3.0 | 3.0 | 2.9 | 190 | 9.5 | 85 |
| 4 | 375 | 460 | 490 | 93 | 475 | 3.0 | 3.0 | 2.9 | 470 | 13.0 | 85 |
| $5_b$ | 550 | — | 520 | 18 | 520 | 3.0 | 2.2 | 3.9 | 500 | — | 60 |
| 6 | 280 | 510 | 520 | 19 | 520 | 3.3 | 3.3 | 2.6 | 240 | — | 75 |
| 7 | 265 | 539 | 520 | 18 | 520 | 2.5 | 1.8 | 2.2 | 210 | — | 77 |
| 8 | 300 | 500 | 500 | 18 | 500 | 3.0 | 1.8 | 2.7 | 210 | — | 65 |
| 9 | 500 | 500 | 520 | 20 | 520 | 3.6 | 6.9 | 2.9 | 280 | — | 81 |

$_a$High impact PS formulation 5.5% rubber
$_b$PS formulation (no rubber)
$_c$MFI measured according to ASTM Method D-1238, Condition G
$_d$MWD (Mol. weight distribution) measured by gel permeation chromatography ASTM-D3593-77
$_e$Residual styrene monomer measured by gas chromatography using internal standard
$_f$Swell index method reported in U.S. Pat. No. 4,777,210, pp. 9–10

Table III above illustrates specific examples taken from pilot plant operations utilizing the process of the present invention. For example, the MFI can be varied from as low as 1.8 to as high as 6.9 by varying the temperature in the heat exchanger from 265° F. to 500° F.. The MWD can be adjusted from 2.2 to 3.9 by varying the temperatures in the heat exchanger from 265° F. to 550° F. Production rates can be increased from a low of 60 lbs/min. to a high of 120, and swell index from 9.5 to 13.

Additionally, various parameters can be varied to achieve optimum levels of different polymer properties. In some cases, one particular property of the polymer can be varied by more than one method. Certain properties, for instance, can be optimized by either adjusting the thermodynamic parameters of the process, including temperatures and pressures; or the properties can be optimized by adjusting a particular parameter such as strand diameter in DV-2. Strand diameter in this devolatilizer is normally varied by adjusting the nozzle flow diameter. As mentioned hereinabove, nozzle diameter is preferably in the range of 5/32" or less, and more preferably 3/64" or less. The minimum diameter of the nozzle in DV-2 is limited by the physical practicalities of forming many small holes in the hoop manifold 15, by the maximum practical workable pressure drop across the nozzles, by the maximum pressure rating of the manifold, and to a certain extent by the maximum desirable shear rate in the material being flowed through the nozzles.

Although a specific preferred embodiment of the present invention has been described in the detailed description above, the description is not intended to limit the invention to the particular forms of embodiments disclosed therein, since they are to be recognized as illustrative rather than restrictive and it will be obvious to those skilled in the art that the invention is not so limited. For example, whereas particular heat exchanger configurations, such as upflow and downflow are disclosed in particular locations, it is clear that one skilled in the art could obtain similarly improved products by utilizing downflow or horizontal flow heat exchangers in place of upflow; and likewise could utilize upflow or horizontal flow heat exchangers in place of the disclosed downflow unit. Thus, the invention is declared to cover all changes and modifications of the specific examples of the invention herein disclosed for purposes of illustration which do not constitute departure from the spirit and scope of the invention.

We claim:

1. A method of removing volatiles from newly polymerized monovinyl aromatic compounds, said method comprising the steps of:

taking a product stream from a monovinyl aromatic polymerization system;

flowing said product stream through a first heat exchanger and heating said product stream;

flowing said heated product stream through a second heat exchanger and into a first vacuum devolatilizer connected to said second heat exchanger;

flowing a partially devolatilized product stream from said first devolatilizer into a second vacuum devolatilizer operated at a greater vacuum than said first devolatilizer and wherein said second devolatilizer is a vetical falling strand devolatilizer having a plurality of polymer ejection nozzles mounted on a manifold, and said product stream is flowed through said nozzles in strands of less than about 5/32 inch in diameter;

flowing a devolatilized product stream from said second devolatilizer; and, simultaneously drawing volatilized components from said vacuum devolatilizers.

2. The devolatilization method of claim 1 wherein said polymer strands are flowed through said nozzles in diameters of less than about 5/64 inches.

3. The devolatilization method of claim 2 wherein said strand diameters are no greater than about 3/64 inches.

4. The devolatilization method of claim 1 wherein said first heat exchanger is operated at temperatures of from about 300° F. up to about 550° F.

5. The devolatilization method of claim 1 wherein said second heat exchanger is operated at temperatures of from about 440° F. up to about 550° F.

6. The devolatilization method of claim 1 wherein said first devolatilizer is operated at a vacuum of about 10 up to about 200 Torr.

7. The devolatilization method of claim 1 wherein said second devolatilizer is operated at a vacuum of less than about 20 Torr.

8. The devolatilization method of claim 1 wherein said first heat exchanger is operated at temperatures of from about 400° F. to about 500° F.

9. The devolatilization method of claim 1 wherein said first heat exchanger is operated at a temperature between 300° F. and 400° F.

10. A method of devolatilizing monovinyl aromatic compounds and varying the melt flow index, the swell index, the molecular weight distribution, the production rate and the level of volatiles in said compounds, said method comprising:

taking a product stream from a monovinyl aromatic polymerization system;

flowing said product stream through a first heat exchanger and adding heat thereto;

flowing said heated product stream through a second heat exchanger and adding further heat thereto;

flowing said heated polymer stream from said second heat exchanger into a first vacuum devolatilizer;

partially devolatilizing said product stream in said first vacuum devolatilizer;

flowing said partially devolatilized product stream through a second vacuum devolatilizer having a plurality of strand-forming nozzles located therein, and;

removing volatile components from said first and second devolatilizers.

11. The devolatilization method of claim 10 wherein the melt flow index and molecular weight distribution of said product stream are varied by varying the amount of heat added to said product stream in said first heat exchanger.

12. The devolatilization method of claim 12 wherein said first heat exchanger is operated at a temperature of between 400° F. and 500° F., and said-second heat exchanger is operated at a temperature of between 500° F. and 550° F.

13. The devolatilization method of claim 11 wherein said first heat exchanger is operated at a temperature of between 300° F. and 400° F., and said second heat exchanger is operated at a temperature of between 440° F. and 550° F.

14. The devolatilization method of claim 10 wherein the swell index of said product stream is varied by varying the level of vacuum in said vacuum devolatilizers and varying the size of said strand-forming nozzles.

15. The devolatilization method of claim 14 wherein the vacuum level in said first devolatilizer is maintained at around 200 Torr and the vacuum level in said second devolatilizer is maintained at less than 20 Torr.

16. The devolatilization method of claim 15 wherein said strand-forming nozzles have openings of less than 5/64 inches diameter.

17. The devolatilization method of claim 10 wherein the volatile level of said product stream is reduced by maintaining said first heat exchanger at a temperature of 300° F. to 400° F., said second heat exchanger at a temperature of 440° F. to 550° F., said first devolatilizer at a vacuum level of 10–200 Torr, said second devolatilizer at a vacuum level of less than about 20 Torr, and said strand-forming nozzles at a diameter no greater than 3/64 inches.

* * * * *

UNITED STATES PATENT AND TRADEMARK OFFICE
CERTIFICATE OF CORRECTION

PATENT NO. : 5,540,813

DATED : July 30, 1996

INVENTOR(S) : Jose M. Sosa; Robert M. Scates; James M. Waguespack; Bruce P. Blackmar; and Scott W. Davis It is certified that error appears in the above-identified patent and that said Letters Patent is hereby corrected as shown below:

Title page, item [75]
Inventor name, James N. Weguespack, listed incorrectly.

The inventors name should be listed as James N. Waguespack.

Signed and Sealed this

Seventh Day of September, 1999

Attest:

Q. TODD DICKINSON

Attesting Officer

Acting Commissioner of Patents and Trademarks